Dec. 31, 1935.    F. E. MYARD    2,026,244
UNIVERSAL CONSTANT SPEED JOINT
Filed March 31, 1934    2 Sheets-Sheet 1

Inventor:
FRANCIS EMILE MYARD
By
Townsend+Decker
Attorneys.

Dec. 31, 1935.  F. E. MYARD  2,026,244
UNIVERSAL CONSTANT SPEED JOINT
Filed March 31, 1934   2 Sheets-Sheet 2
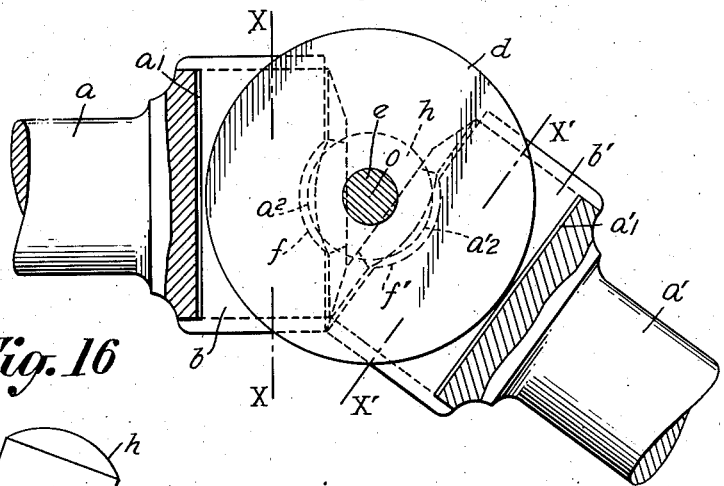
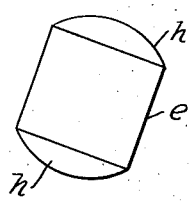
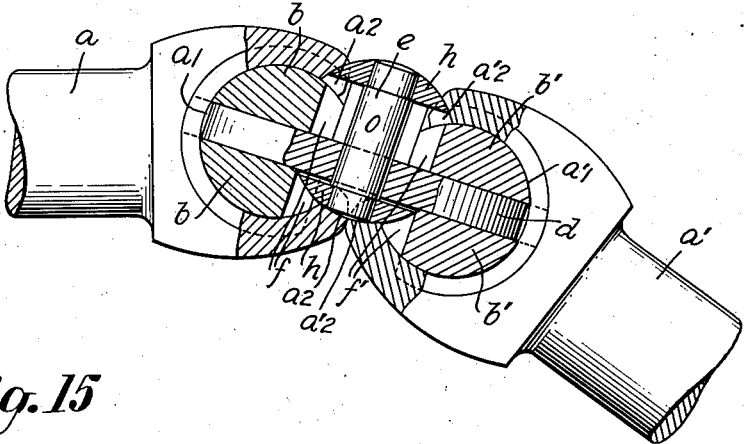
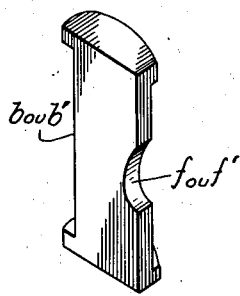
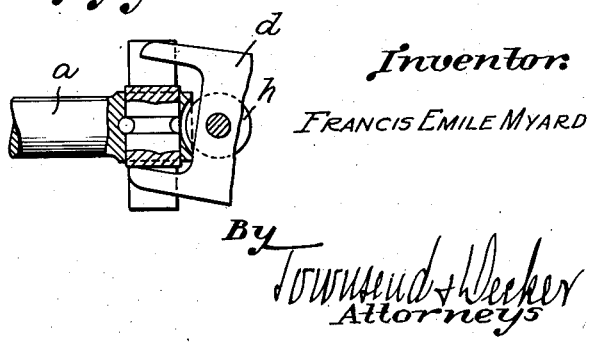
Inventor:
FRANCIS EMILE MYARD Patented Dec. 31, 1935

2,026,244

UNITED STATES PATENT OFFICE 2,026,244

UNIVERSAL CONSTANT SPEED JOINT

Francis Emile Myard, Paris, France

Application March 31, 1934, Serial No. 718,415
In France April 6, 1933

5 Claims. (Cl. 64—21)

The present invention has as its subject a homokinetic transmission coupling which is particularly applicable to front wheel drive on self-propelled vehicles.

All the transmission couplings with closed pairs are characterized (as the author of the present invention was the first to disclose and prove geometrically, see "Le Genie Civil" of the 15th April and 10th June 1933) by the combination of two pivot joints connected by a flat joint, but the coupling which forms the subject of the present invention is distinguished in particular from the other known couplings of the same kind by the fact that of itself it necessarily gives absolute homokineticism without necessitating for this purpose, as in the case of these other couplings, an external complementary connection to keep the two shafts to be joined in the concurrent position and consequently symmetrical.

The said coupling forming the subject matter of the invention shows moreover as compared with the other related couplings, great simplicity and extreme ease of mechanical realization.

In this coupling the two shafts to be connected comprise at their ends facing one another (identical geometrically) pivot joints arranged similarly and provided with flat parallel faces bearing against the flat faces of a member forming a flat joint which is connected by a sliding element to a ball joint the centre of which is the geometric point of intersection of the said shafts which abut on the other hand against this ball. Due to this sliding connection between the ball constituting a ball joint and the member constituting a flat joint, this latter is maintained in space and cannot come adrift.

Each pivot connection (pivot joint) may be constituted in particular by a system of blocks or other members with flat parallel faces. It is preferably by two blocks or turning members (the transverse section of which is segmental) located in a boring at the end of the shaft, which end in this case is open in the form of a fork.

The member with parallel faces forming a flat joint is preferably constituted according to the invention by a single plate capped by the two pivot joints constituted preferably by two blocks the transverse section of which is segmental and may act by its external faces.

The ball forming the ball joint according to the invention may be constituted by two spherical bearing surfaces located on each side of the single plate of the flat joint and so surrounds this plate, the two spherical bearing faces of the ball being connected by a rod sliding in the said single plate of the flat joint. In any case as here above stated, the flat joint and the ball joint are connected together by a sliding connection.

Thus, besides the combination of the two pivot joints and the flat joint (already known in close couplings with closed pairs) there is here, that is to say in the coupling according to the invention, a ball joint (against which the two shafts to be connected abut axially, which ensures symmetry from the start), and a sliding joint connecting the ball joint to the said flat joint formed of a single plate.

In the accompanying drawings there are shown by way of non-limiting examples various embodiments of the subject of the invention.

Figure 4:
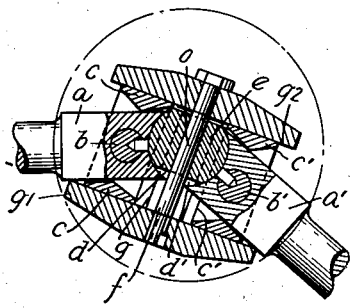
Figure 4 is a horizontal section of the coupling in the arrangement of Figure 3.
Figure 3:
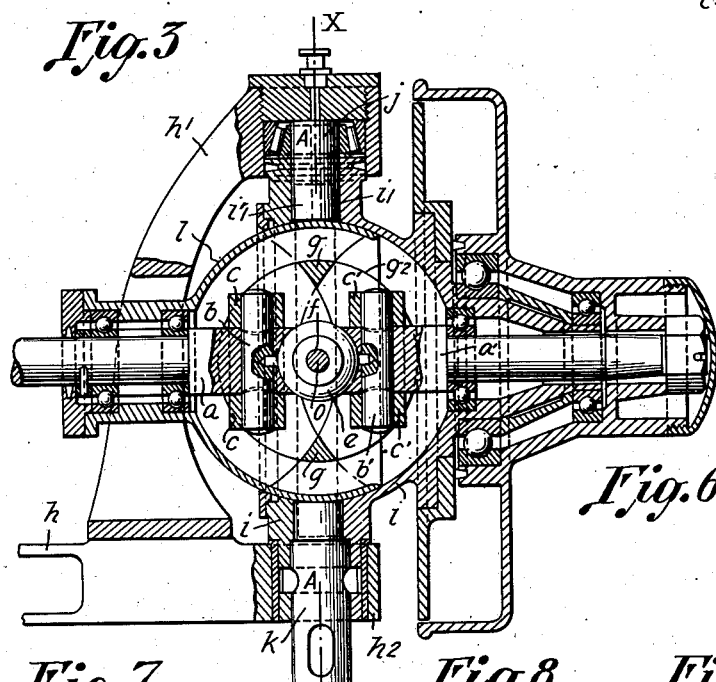
Figure 3 shows a coupling (in which the flat joint is substituted by a double plate and the pivot blocks are made according to a suitable variant) adapted for a front wheel drive system for motor cars.
Figure 8:
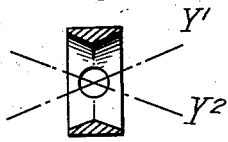
Figure 9:
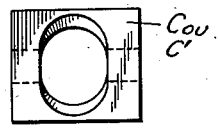
Figure 10:
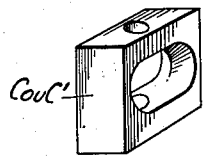

Figures 8 and 9 show in orthogonal projection and figure 10 in perspective, one of the pivoting systems with parallel faces in the case of the coupling shown in Figures 3 and 4.

Figure 11:
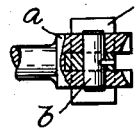
Figure 12:
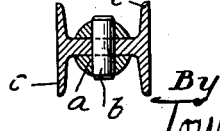

Figures 11 and 12 show in longitudinal and transverse section respectively one of the shafts to be connected comprising a pivoting system with parallel faces constructed according to another variant.

Figures 13 and 14 show in two successive positions of rotation differing by a quarter turn the coupling according to the invention in which the flat joint is constituted by a single plate which the two pivot joints cap.

Figure 15 is a perspective view of the member constituting in this case half the pivot block.

Figure 16 is a modified construction of the ball in this case, in which the two spherical bearing surfaces and the connecting rod are made in one piece.

Figure 17 is a schematic representation of another variant of the coupling.

Figure 1:
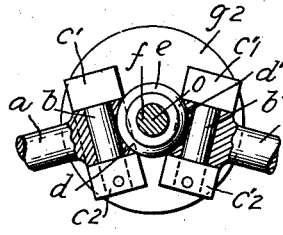
Figures 1 and 2 show the coupling generally and schematically, the two figures showing it for the same obliquity in two positions of rotation differing by a quarter turn.
Figure 2:
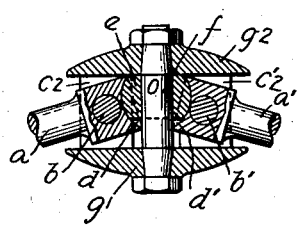

Referring to Figures 1 and 2, it will be seen that the ends of the two intersecting shafts $a$ and $a'$ are geometrically identical and provided with pivots $b$ and $b'$ connected respectively to the pairs of blocks $c_1$, $c_2$ and $c_1'$, $c_2'$. The axes of the shafts $a$ and $a'$ meet at the point O which is the centre of a sphere $e$ upon which abut, by means of the spherical faces $d$ and $d'$, the two shafts $a$ and $a'$. A hole is drilled through this sphere $e$, in which slides a bar $f$ which connects, perpendicularly to their plane and centrally to them, the two circular plates $g^1$ and $g^2$ with parallel faces. The two pivots $b$ and $b'$ form the two pivot joints and the flat joint is effected by means of two parallel plates $g^1$ and $g^2$ embracing the two pivotal systems with parallel faces and constraining the axes of the two pivots to be always in the same plane. Finally the sphere $e$ causing the two axes $a$ and $a'$ always to meet at its centre O, produces symmetry under these conditions from the start and therefore homokineticism; and the bar $f$ which periodically slides inside the sphere $e$ permits the desired relative movement of the assembly of the plates and it ensures that this assembly will be quite definitely maintained during rotation.

Figure 3 shows the coupling adapted for a front wheel drive system. The power is applied to the shaft $a$ which transmits it to the shaft $a'$.

The mounting surrounding the coupling proper (forming the subject of the present invention), can be carried out in many ways, either according to any of the orthodox methods for independent or other wheels, or in other ways. In the solution shwn in the drawings, the front axle $h$ of the vehicle carries, bolted upon it, or pressed in one piece with it, the supporting arm $h_1$. The cast hemispherical shell $i$ is capped by the cover $i'$ bolted upon it along the diametrical plane A—A and by means of collars $i_1$ and $i'_1$. Between these two members the two pivots $j$ and $k$ are fixed. The upper pivot $j$ is subjected, by means of a Timken or other anti-friction bearing (or simply by a flat bearing surface), to a vertical downward thrust due to the weight of the vehicle. The lower pivot $k$ carries the lever pivoted to the steering rod and if desired the steering lock control lever. (These levers may be placed elsewhere.) The shell $i$ carries moreover the brake back plate and, by means of suitable roller bearings, the shaft $a'$ and the brake drum. It is pivoted on the axis X—X. (In the drawings the axle journal $a'$ is not tilted with respect to the axis X—X. In practice the wheel would be inclined upon the axis X—X.)

The spherical shell $l$ is enclosed in the housing formed by the shell $i$ and the cover $i'$. It is connected by means of suitable anti-friction bearings to the shaft $a$ which is driven (as regards its rotary movement) either by a flexible coupling or by a sliding Cardan shaft, or by any other suitable means. The flexures of the suspension springs manifest themselves in a slight pivoting of the assembly (shell $l$ and shaft $a$) around the horizontal axis illustrated at the point O.

A suitable lubricating device is provided and packings prevent loss of oil and entry of dust.

Figure 5:
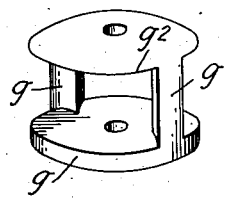
Figure 5 shows in perspective the member forming the double plate, of the same.
Figure 6:
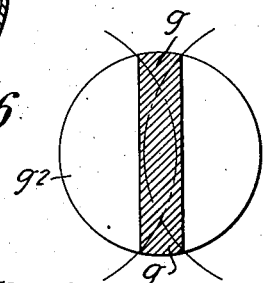
Figure 6 is the transverse section of the stamped blank intended for making this double plate milling.

The transmission coupling proper forming the subject-matter of the invention is as described above. But in order to obtain great rigidity of the system of the two parallel plates $g^1$, $g^2$, (while reducing the diameter of the shaft $f$, which makes it possible to have a larger bearing surface of the spherical abutments $d$ and $d'$ of the shafts $a$ and $a'$, and in consequence a wider steering lock easily reaching 40 and more degrees without risk of the sphere $e$ tending to escape from its housing) the member constituting the two plates $g^1$ and $g^2$ can be made as follows: In a thick bar, or in a pressed member (Figure 6) two cuts are taken with a three cut milling cutter so as to form the two useful parallel faces leaving between them the two supports $g$, $g$ (of curvilinear triangular section) which give the greatest strength for the least space occupied (Figure 5). But numerous modifications are obviously possible for this double plate device.

Figure 7:
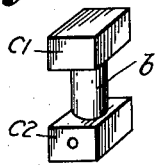
Figure 7 shows in perspective one of the pivoting systems with parallel faces corresponding to Figures 1 and 2 (system of two blocks fixed to a common pivot axis).

The pivoting systems with parallel faces may thus have several embodiments. Thus the double blocks $c_1$, $c_2$ and $c_1'$ and $c_2'$ (Figures 1, 2 and 7) instead of being arranged so that their supporting pivoting axis ($b$ or $b'$) rotates in the corresponding shaft (as provided in the drawings), may on the contrary cap the two projecting ends of a stationary sleeved axis in the shaft, and may pivot upon its projecting cylindrical bearing surfaces—axial stops then being conveniently provided.

These pivoting systems with flat faces may also be set up as shown in Figures 3 and 4 and in greater detail in Figures 8 to 10. This modification makes it possible to obtain good contact (thus a low unital pressure, low wear, and absence of seizing), a great strength and very reliable grip. In this modification everything occurs as if the previous blocks $c_1$, $c_2$ and $c_1'$ and $c_2'$ were connected respectively at $c$ and $c'$. To carry out the hollowing of these members a two cut milling cutter may be used, the corresponding limiting positions of which extend from $Y_1$ to $Y_2$ (Figure 8), or this may be carried out by boring.

Figures 11 and 12 show another possible arrangement in the construction of the pivoting members. In these figures the double blocks $c$, $c$ are constituted by a member of double T-shape connected to the shaft $a$ by a supporting pivotal axis $b$.

In the modification of Figures 13 to 15 the two converging shafts $a$ and $a'$ each carry in a geometrically identical way a circular cylindrical and open boring $a_1$ and $a'_1$ (that is to say, in the form of a fork) forming the housing of the corresponding pivot joint. The two pivot joints have as their geometric axes respectively the straight lines X X' arranged in a similar way and preferably each perpendicular to the corresponding shaft. Each pivot joint or pivot block is constituted by means of two identical members such as $b$, $b$ or $b'$, $b'$ which are inserted in the opening of the corresponding fork and placed against the walls of its boring. Each piece $b$ or $b'$ has at its ends two collars or bearing cheeks which locate it axially.

The flat joint is constituted by means of the circular plate with flat faces $d$ which is housed in each fork between the two corresponding members $b$, $b$, and $b'$, $b'$. Its erectification is very convenient.

To make the members $b$, $b'$ one may, for example, turn a drawn cylindrical bar having a flat. The cheeks being thus obtained, a milling cut is then carried out (in the longitudinal direction) of width equal to the thickness of the plate d, thus producing the two pieces which constitute each block, erectification of which after heat treatment being simple.

Two separate and identical bars may also be provided, drawn to the cross section of the members b or b'; these two bars, which are held by a mounting spaced at a distance apart equal to the thickness of the plate d (the flat surfaces being opposite) will then be subjected on their outer cylindrical operating faces either to a turning or machining operation on to the circular plate.

The ball, of which the two caps h, h are connected together by the tie bar e, serves as a stop for the two shafts a and a', each fork being provided for this purpose at its terminal zone with a corresponding spherical bearing surface (sufaces $a_2$ and $a_2'$). This sphere thus causes the two shafts to meet—which in this particular case gives rise to symmetry and thus homokineticism.

In addition the flat joint, constituted by the plate d, is connected to the ball joint, constituted by the ball h having the centre O, by means of a sliding connection (also called sliding pair or prismatic pair) constituted by the tie bar e upon which the plate d slides and is provided for this purpose with a corresponding boring. This connection ensures correct maintenance of the flat joint system without which it would come adrift and escape from its housing.

Suitable grooves and flats will in practice be applied to the parts to which they are appropriate in order to economize space (by the most compact assembly of the whole arrangement) and to allow large inclinations of the shafts a and a' in relation to each other. The drawings show these flats and grooves (those at f and f' for example). It is obvious that such a solution gives a robust coupling taking up little space and particularly easy to manufacture at small cost. The thrusts are taken on large surfaces which are not reduced in spite of varying inclinations (which give low unital pressure).

It is clear too that many other detailed modifications as regards the distribution of material and shapes, grooves etc. can be made and form of course, part of the invention. In particular the diameter of the tie bar e may be increased until it equals the base diameter of the cap h.
In this case the fitting allows this assembly (blocks h h and bar e) to be made in one piece (Figure 16) which gives a great manufacturing advantage while reducing slightly the strength of the plate.
Other modifications are likewise possible in the construction of the pivot blocks which may, for example, be each in the form of a mortise and a single suitable piece. Modifications also in the form of the ball and the tie bar are possible (the latter being if desired of polygonal section). In particular instead of concave spherical bearing surfaces arranged within the forks there could be provided convex bearing surfaces (situated upon the outer part of the forks).
The two pieces which form the ball would then cap these surfaces, (each one having a concave spherical bearing surface), and the tie bar unites in any desired manner these two internal spherical caps.

According to another modification illustrated in Figure 17 the shafts a, a' are no longer each in the form of an open fork, but the plate d is hollowed.

I claim:
1. A coupling for connecting two shafts comprising identical pivot joints arranged at the ends of the shafts, said joints comprising yoke members integral with the shafts and two members having spaced apart parallel flat surfaces journalled in each yoke member, a flat plate contacting the said flat faces of the members of the pivot joints and a sliding member passing through the center of the flat plate and connected at its ends to spherical segments the center of which is at the point of intersection of the shafts, the spherical segments also bearing in spherical sockets formed on the yoke members.

2. A coupling for connecting two shafts comprising identical pivot joints arranged at the ends of the shafts, said joints comprising yoke members integral with the shafts and two substantially semi-cylindrical members having spaced apart parallel flat surfaces journalled in each yoke member, a circular flat plate contacting the flat faces of the semi-cylindrical members and a sliding pin passing through the center of the circular plate and provided at its ends with spherical segments the center of which is at the point of intersection of the shafts, the spherical segments also bearing in spherical sockets formed on the yoke members.

3. A coupling for connecting two shafts comprising identical pivot joints arranged at the ends of the shafts, said joints comprising yoke members integral with the shafts and two members having spaced apart parallel flat surfaces journalled in each yoke member, a flat plate contacting the said flat faces of the members of the pivot joints, and a sliding cylindrical pin passing through the center of the flat plate and provided at its ends with spherical segments integral therewith.

4. A coupling for connecting two shafts comprising identical pivot joints arranged at the ends of the shafts, said joints comprising yoke members integral with the shafts and two substantially semi-cylindrical members provided with grooves and having spaced apart parallel flat surfaces journalled in each yoke member, a flat plate contacting the said flat faces of the members of the pivot joints and a sliding member passing through the center of the flat plate and connected at its ends to spherical segments the center of which is at the point of intersection of the shafts, the spherical segments also bearing in spherical sockets formed on the yoke member.

5. A coupling for connecting two shafts comprising identical pivot joints arranged at the ends of the shafts, said joints comprising yoke members integral with the shafts and two members having spaced apart parallel flat surfaces journalled in each yoke member, a flat plate contacting the said flat faces of the members of the pivot joints and provided with a groove so as to form projecting portions which are located between the pivot joints on each side of the end of each of the shafts to be coupled and a sliding member passing through the center of the flat plate.

FRANCIS EMILE MYARD.